United States Patent
Raviv

(10) Patent No.: US 8,646,073 B2
(45) Date of Patent: Feb. 4, 2014

(54) DETECTION OF ACCOUNT HIJACKING IN A SOCIAL NETWORK

(75) Inventor: Gil Raviv, Kfar Yona (IL)

(73) Assignee: Check Point Software Technologies Ltd., Tel Aviv (IL)

(*) Notice: Subject to any disclaimer, the term of this patent is extended or adjusted under 35 U.S.C. 154(b) by 244 days.

(21) Appl. No.: 13/110,017

(22) Filed: May 18, 2011

(65) Prior Publication Data

US 2012/0297477 A1    Nov. 22, 2012

(51) Int. Cl.
*G06F 21/00* (2013.01)
*G06F 21/31* (2013.01)
*H04L 29/06* (2006.01)
*H04L 29/08* (2006.01)

(52) U.S. Cl.
CPC .............. *G06F 21/316* (2013.01); *G06F 21/00* (2013.01); *H04L 63/1425* (2013.01); *H04L 67/306* (2013.01); *H04L 67/02* (2013.01)
USPC ................... 726/22; 726/23; 726/24; 726/25; 726/7; 726/1; 709/224; 705/30; 705/38; 705/39; 705/40; 705/41

(58) Field of Classification Search
CPC ... G06F 21/316; G06F 21/00; H04L 63/1425; H04L 67/306
USPC ............... 726/22–25, 1–7; 705/30, 38–41; 709/224
See application file for complete search history.

(56) References Cited

U.S. PATENT DOCUMENTS

| | | | |
|---|---|---|---|
| 2005/0086166 A1* | 4/2005 | Monk et al. | 705/41 |
| 2007/0073630 A1* | 3/2007 | Greene et al. | 705/80 |
| 2009/0327006 A1* | 12/2009 | Hansan et al. | 705/7 |
| 2010/0004965 A1* | 1/2010 | Eisen | 705/7 |
| 2010/0094767 A1* | 4/2010 | Miltonberger | 705/325 |
| 2010/0229230 A1* | 9/2010 | Edeki et al. | 726/7 |
| 2011/0131131 A1* | 6/2011 | Griffin et al. | 705/38 |
| 2011/0145137 A1* | 6/2011 | Driemeyer et al. | 705/39 |
| 2011/0296003 A1* | 12/2011 | McCann et al. | 709/224 |
| 2012/0198513 A1* | 8/2012 | Maida-Smith et al. | 726/1 |

* cited by examiner

*Primary Examiner* — Andrew Nalven
*Assistant Examiner* — Amir Mehrmanesh
(74) *Attorney, Agent, or Firm* — Mark M. Friedman

(57) ABSTRACT

To protect a user of a social network, the user's activity is monitored during a baseline monitoring period to determine a baseline activity record. If subsequently monitored activity of the user deviates sufficiently from the baseline activity record to indicate abuse (hijacking) of the user's account, the abuse is mitigated, for example by notifying the user of the abuse. Monitored activity includes posting links, updating statuses, sending messages, and changing a profile. Monitoring also includes logging times of the user activity. Monitoring anomalous profile changes does not need a baseline.

26 Claims, 5 Drawing Sheets

Automatic Detection of Hacked Accounts

Regular user activity – 1 link a month

Unusual user activity – 3 links in a day.
Chances for Hacked Account increases

Automatic Detection of Hacked Accounts

Can be hosted as a service on the Cloud
Or as a client on the user's computer

DETECTION OF ACCOUNT HIJACKING IN A SOCIAL NETWORK

FIELD AND BACKGROUND OF THE INVENTION

The present invention relates to social networks and, more particularly, to a method and system for detecting that a user's account on the social network has been hijacked.

As modern society expands its human interactions through social networks on the Internet, and a new generation becomes reliant on these interactions, it is clear that the protection of one's identity in these social networks is growing to be a crucial task. There are increasing interests by many to abuse other's identity in social networks. These interests are not new, but are easier to achieve through the viral effect that the social networks provide.

The abusers do their best to take control of innocent users' accounts. Once that control is obtained, the abusers are able to spam more users, infect computers with malware, misuse the stolen accounts to steal money or virtual goods, or just harm the users' reputations. Usually the abuse includes at least one link to an external website which lures more users to give away their account credentials (Phishing).

When a person hijacks the credentials of another user, s/he may decide to "steal" the account by resetting the password—an action that will prevent the real user from accessing his/her account until s/he resets his/her password. However, it is more effective to abuse the user's account without resetting his/her password. This way, the hijacker can use the account for a long period of time, sometimes even for months, without the user's awareness that his/her account has been hijacked. The abuse will end when the real user realizes that his account contains changes that were not made by him/her, and only if s/he is knowledgeable enough to reset his/her password. Many users don't have this knowledge, and when they notice that spam or undesired content has been sent from their accounts, they ignore the problem without resetting their passwords.

The potential damage that users may suffer when they fall victims to account hijacking is significant. Their privacy and reputation are at high risk. Therefore, if an automatic way can be found to detect scenarios of hijacked accounts in close to real time, and to alert the victims, reputation damage can be reduced, the breach in their privacy can be minimized, and the viral spread of hijacked accounts incidents of account hijacking can be slowed down.

SUMMARY OF THE INVENTION

According to the present invention there is provided a method of protecting a user of a social network, including the steps of: (a) monitoring activity of the user on the social network during a baseline monitoring period to determine a baseline activity record; (b) monitoring activity of the user on the social network subsequent to the baseline monitoring period; (c) determining whether the activity of the user on the social network subsequent to the baseline monitoring deviates sufficiently from the baseline activity record to indicate abuse of the user's account on the social network; and (d) if the activity of the user on the social network subsequent to the baseline monitoring deviates sufficiently from the baseline activity record to indicate abuse of the user's account on the social network: mitigating the abuse.

According to the present invention there is provided a system for managing a social network, including: (a) a memory for storing code for protecting a user of the social network by: (i) monitoring activity of the user on the social network during a baseline monitoring period to determine a baseline activity record, (ii) monitoring activity of the user on the social network subsequent to the baseline monitoring period, (iii) determining whether the activity of the user on the social network subsequent to the baseline monitoring deviates sufficiently from the baseline activity record to indicate abuse of the user's account on the social network, and (iv) if the activity of the user on the social network subsequent to the baseline monitoring deviates sufficiently from the baseline activity record to indicate abuse of the user's account on the social network: mitigating the abuse; and (b) a processor for executing the code.

According to the present invention there is provided a computer-readable storage medium having embodied thereon computer-readable code for protecting a user of a social network, the computer-readable code including: (a) program code for monitoring activity of the user on the social network during a baseline monitoring period to determine a baseline activity record; (b) program code for monitoring activity of the user on the social network subsequent to the baseline monitoring period; (c) program code for determining whether the activity of the user on the social network subsequent to the baseline monitoring deviates sufficiently from the baseline activity record to indicate abuse of the user's account on the social network; and (d) program code for: if the activity of the user on the social network subsequent to the baseline monitoring deviates sufficiently from the baseline activity record to indicate abuse of the user's account on the social network: mitigating the abuse.

According to the present invention there is provided a method of protecting a user of a social network, including: (a) monitoring a profile of the user on the social network to detect a change in the profile; (b) upon detecting the change, determining whether the change is anomalous; and (c) if the change is anomalous: mitigating the change.

According to the present invention there is provided a system for managing a social network, including: (a) a memory for storing code for protecting a user of the social network by: (i) monitoring a profile of the user to detect a change in the profile, (ii) upon detecting the change, determining whether the change is anomalous, and (iii) if the change is anomalous: mitigating the change; and (b) a processor for executing the code.

According to the present invention there is provided a computer-readable storage medium having embedded thereon computer-readable code for protecting a user of a social network, the computer-readable code including: (a) program code for monitoring a profile of the user on the social network to detect a change in the profile; (b) program code for, upon detecting the change, determining whether the change is anomalous; and (c) program code for mitigating the change if the change is anomalous.

As most broadly envisioned, the first method of the present invention includes four steps. In the first step, activity of a user of a social network is monitored during a baseline monitoring period to determine a baseline activity record. After the baseline activity record has been determined, the method continues to monitor the user's activity on the social network. If the monitored activity of the user deviates sufficiently from the baseline activity record to indicate abuse of the user's account on the social network, the abuse is mitigated.

One form of user activity that preferably is monitored is the posting of links by the user, for example by monitoring the frequency with which the user posts links, and/or by classifying the links in classes such as neutral, news, shopping, gambling, drugs, terror, xenophobia, adult, malware, hacking, criminal activity and child abuse, and calculating statistics of the links in one or more of these classes, and/or by monitoring how the links are distributed to their respective recipients and calculating statistics of the distributions. Note that these classes are merely exemplary: the scope of the appended claims is not limited to these classes. Also note that some of these exemplary classes are mutually overlapping. For example, news and shopping are neutral; hacking is a criminal activity; and child pornography may fall in the categories of adult, criminal activity and child abuse. Abuse of this form of user activity preferably is mitigated by posting a disclaimer of the abusive posting and/or by notifying the user of the abuse.

Another form of user activity that preferably is monitored is the user's status updates, for example, by classifying the words used in the status updates among classes such as "neutral", "racist", "obscene", "psychopathological", "suicidal" and "cyberbullying", and calculating statistics of the words of one or more of the classes. Note that these classes are merely exemplary: the scope of the appended claims is not limited to these classes. Also note that some of these exemplary classes are mutually overlapping. For example, cyberbullying language may be racist and/or obscene, and suicidal language is a subset of psychopathological language. Abuse of some of these forms of user activity preferably is mitigated by posting a disclaimer of the abusive status update and/or by notifying the user of the abuse.

Another form of user activity that preferably is monitored is the sending of messages by the user, for example, by classifying the words used in the messages among classes such as "neutral", "racist", "obscene", "psychopathological", "suicidal" and "cyberbullying", and calculating statistics of the words of one or more of the classes. Note that these classes are merely exemplary: the scope of the appended claims is not limited to these classes. Also note that some of these exemplary classes are mutually overlapping. For example, cyberbullying language may be racist and/or obscene, and suicidal language is a subset of psychopathological language. Abuse of some of these forms of user activity preferably is mitigated by posting a disclaimer of the abusive message and/or by notifying the user of the abuse.

Another form of user activity that preferably is monitored is the changing of a profile (typically the user's profile) or of an entry in a profile, for example by monitoring the frequency of the changes and/or checking the consistency of a change of a profile entry, subsequent to the baseline monitoring with the prior configuration of the profile. Abuse of this form of user activity preferably is mitigated by notifying the user of the abuse.

Another preferable form of monitoring of user activity is logging the times of the user activity and calculating statistics of the logged times. Preferably, the user is notified of deviations of logged times subsequent to the baseline monitoring that deviate suspiciously from the baseline times.

Another preferable form of monitoring is calculating joint statistics on one or more aspects of each of two modes of user activity. In the examples presented below of such monitoring, one of the modes is posting links and the other mode is status updating or message sending. The aspect of status updating or message sending that is correlated with the link posting includes one or more of the classes of the words used in the status updates or in the messages.

A second method of the present invention is similar to the first method but, being directed at detecting and mitigating anomalous changes to a user's profile on a social network, does not need a baseline.

The scope of the present invention also includes systems for implementing the method of the present invention and computer-readable storage media that have embodied thereon computer-readable code for implementing the methods of the present invention.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of detection of account hijacking in a social network according to the present invention may be better understood with reference to the drawings and the accompanying description. The examples herein are oriented towards Facebook™ as an exemplary social network but those skilled in the art will understand from the description herein how to apply the principles of the present invention to other social networks such as Twitter™, Myspace™ and LinkedIn™.

High-Level Description

To detect account hijacking automatically, the present invention asks the user to allow an application of the targeted social network (e.g. a Facebook™ application) to constantly monitor the user's account. To initiate the monitoring, the user provides the application his/her credentials. The application authenticates the credentials with the relevant social network to verify that the request to monitor the user's activity really comes from the user.

During the automatic monitoring, the present invention establishes a baseline activity record of the user's activity. As detailed below, different user activities require different methods for establishing baselines. Some user activities require monitoring for predetermined time periods to establish their baselines. Other user activities require interaction with the user to determine whether such user activities are intentional. Yet other user activities require a combination of determining user intention and monitoring for predetermined time period.

The information sources used to establish the baseline activity record include, but are not limited to:
 Status updates.
 Messages in the user's mailbox, both inbox and outbox.
 Chat messages.
 Profile data (e.g. birthday, education, work experience).
 Online presence (time of day and duration).
The baseline activity record is built on statistical analysis and frequencies of:
 Links that are posted by the user (including the links' classification—e.g. adult sites, gambling or illegal drugs).
 Inappropriate language that is used by the user.

Profile changes hat the user performs on his/her account.

The normal times during the day that the user is active on the social network.

Figure 1:
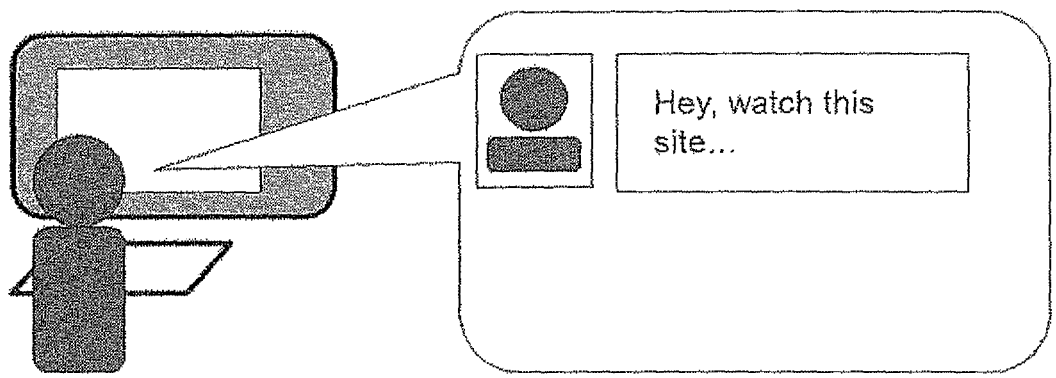
FIG. 1 presents an example of a baseline activity record and its subsequent anomaly.
Figure 1:
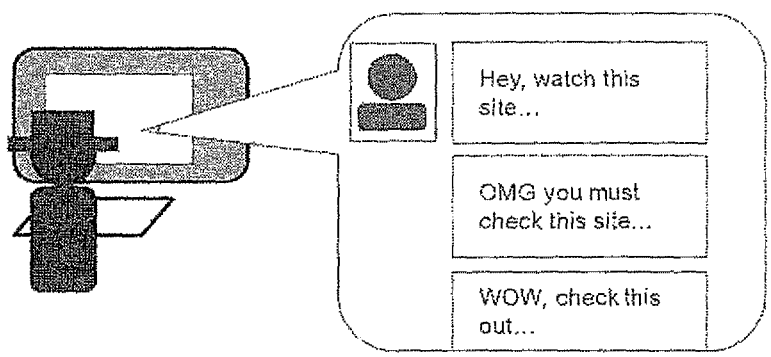

Referring now to the drawings, FIG. 1 illustrates a baseline activity record and its subsequent anomaly for a user whom we name Alice for illustrational purposes.

Alice typically posts one link to her friends once a month, and uses two words that are in an inappropriate language database. An appropriate baseline activity monitoring time period for such activity of such a user is one to three months.

When the present invention finds a significant deviation in user activity from the baseline activity record, the present invention reports to the user, through e-mail, SMS, or other means, and suggests to him/her that his/her account might have been hijacked.

So in the baseline example of Alice, if the present invention finds a sudden increase of links that Alice submits, or finds that the links are classified as sites, such as spam or adult sites, that Alice did not post during the monitoring period, or sees that Alice uses new inappropriate words that are not typical to her, the present invention suspects that someone else has abused her account, and reports the potential hijacked account incident to Alice.

Automatic Detection Main Flow

Figure 2:
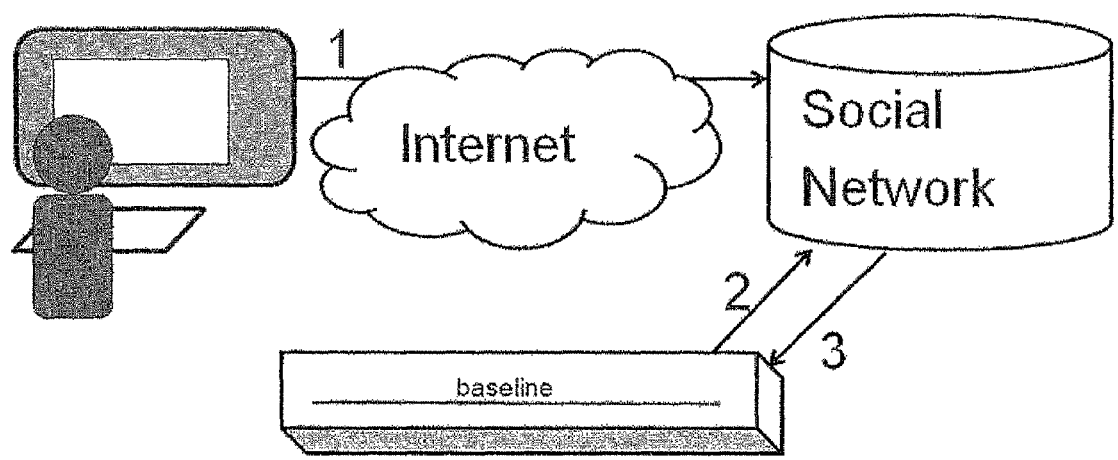
FIGS. 2 and 3 illustrate the automatic detection procedure of the present invention.
Figure 3:
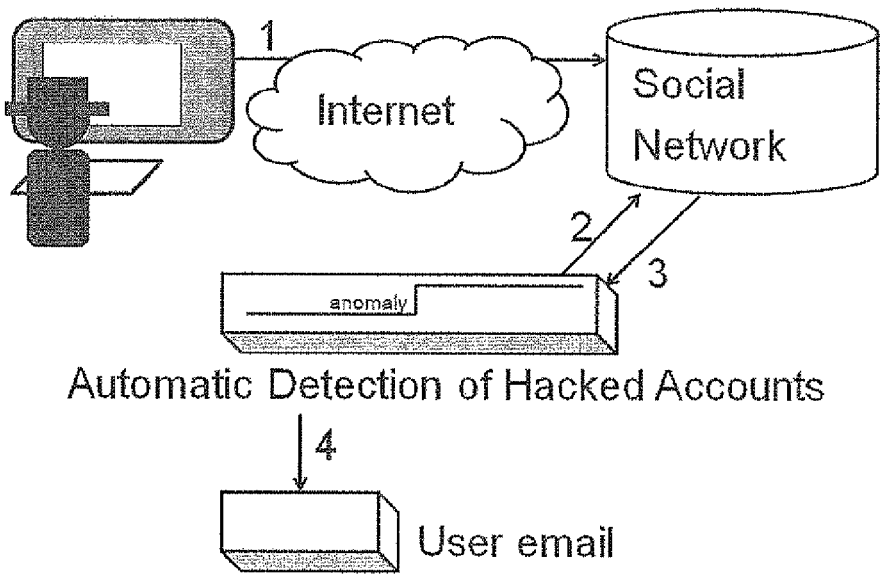

FIGS. 2 and 3 illustrate the automatic detection procedure of the present invention, which can be implemented via an abstracted software service on the Internet ("cloud computing") and/or via client software that is installed on the user's computer. Once the user authenticates to software of the present invention running on the social network site (Step 1), the automatic service of the present invention queries the user's profile through direct communication with the social network platform (Steps 2 and 3). As a result, the user's presence is not required for the ongoing monitoring that the software of the present invention performs. Once the software of the present invention detects an anomaly in the user's profile or activity, the anomaly is reported to the user via email or other notification methods (Step 4 in FIG. 3)

Although the present invention normally is implemented as a software service on the "cloud" and/or as software installed in a user's computer, as described above, the present invention generally can be implemented as any suitable combination of software and/or firmware and/or hardware.

Hijacked Account: Automatic Detection Methods

Suspicious Links

The baseline that the present invention establishes via link analysis includes the following elements:

User classification of links: During baseline monitoring, the first time a user posts a link from any suspicious category, the user is asked whether s/he intended to post that link and whether the posting of such links is a normal activity of the user.

Frequency of links: The present invention counts how many links are posted by the user during pre-determined regular time intervals, for example every week. If a user posts links in a certain category very frequently, for example, 20 links to gambling sites per day, then a monitoring period shorter than a week suffices for that category. As a rule of thumb, a user's normal link posting activity, per category, is established after one week or after the user has posted 20 links in that category, whichever comes first.

Distribution of link classification: Using known classification technology that associates a link (URL) to a category (e.g. adult sites, illegal drugs, gambling, shopping, news, and sites that have been identified as promoting terrorism or xenophobia) the frequency of categories of the links per week is counted. For example: Alice may post to her friends 10 links every week. The links' categories are usually: 3 shopping, 5 news and 3 adult sites. For a different user, each of the 3 adult sites posts may suggest that his/her account was hijacked, but for Alice this is a typical behavior. Note that during the baseline phase, Alice is asked whether the 3 adult sites links were posted by her, to assure that the baseline is not already "contaminated" with hijacker behavior.

Distribution of recipients: Links can be sent to all of the user's friends, or only to selected ones. For users who send links to selected friends, the recipients' distribution is measured. For example: Alice sends 5 links every week to Bob in private message and 5 other links all her friends. Again, as a rule of thumb, 20 distributions or one week, whichever comes first, suffices to define a user's normal distribution behavior.

The present invention reports that an account has been hijacked when significant deviations from the links' baseline are found. The following are several exemplary scenarios:

User posted ten links today, while his/her average frequency is 1 link every month.

User posted a link to an adult site for the first time.

User posted an unclassified link (can be zero hour attack, or a new spam that is not classified yet according to its link) in individual messages to all his/her friends, and this is the first time s/he ever has sent a link through individual messages (for example, posting separate messages of the link to the all the Walls of his/her friends in Facebook).

Figure 4:
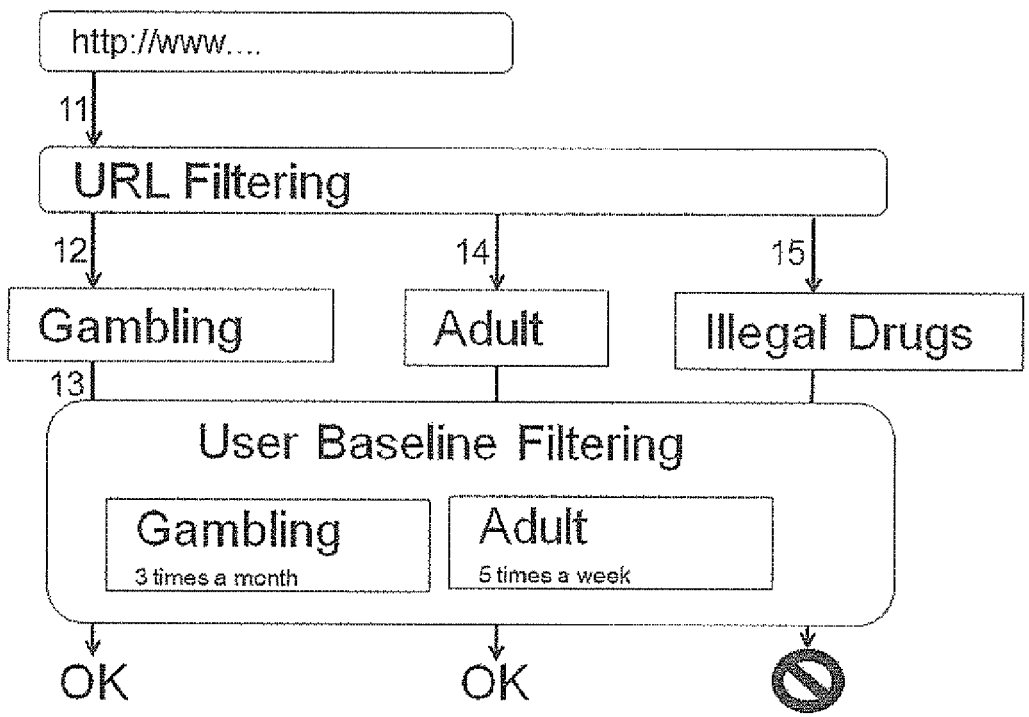
FIGS. 4 and 5 illustrate URL filtering and comparison to a baseline activity record for anomaly detection.
Figure 5:
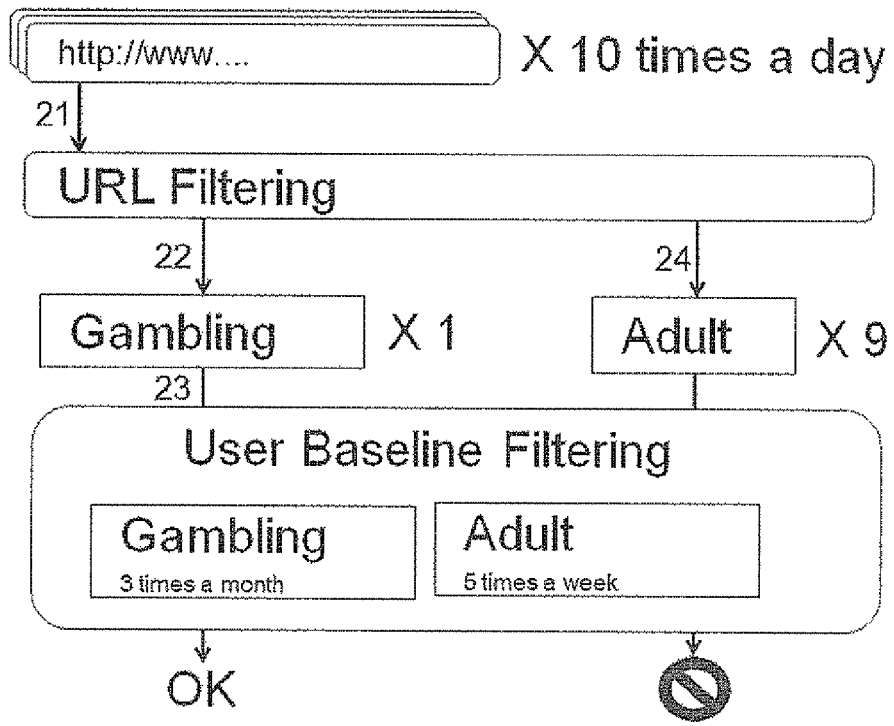

FIGS. 4 and 5 present examples of how specific links are processed by the present invention, first through standard URL filtering that classifies links into content categories, and then through baseline filtering. When the present invention detects a suspicious link or an anomaly in link frequencies, it can notify the possibly hijacked account.

FIG. 4 shows three cases in which the user or a hijacker posts a link. In the first two cases the present invention assumes that the links were posted by the user due to the fact the activity remains within the baseline limits. In the third case the represent invention suspects that the link was posted by a hijacker due to the negative nature of the site linked to and the fact that there was no past evidence that the user posted links with the same nature.

The following are the details of the steps in FIG. 4.

11. A link is posted by the user (or by the hijacker) on the user's page (e.g. on the user's Facebook™ wall).

12. The link is classified by the present invention as a gambling site.

13. The present invention checks the user's baseline and finds that the user normally posts links to gambling sites at a frequency of 3 links per month. Taking into account this new link, if the frequency of posting links to gambling sites is not exceeded significantly, the present invention allows this incident and assumes that the user did post it. The frequency of gambling posts is updated to reflect this new post.

14. A new link is posted by the user (or by the hijacker). This time the site is classified as an adult site. The present invention checks the user's baseline and finds that the user normally posts links to adult sites at a frequency of five links per week. Taking into account this new link, if the frequency of posting links to adult sites is not exceeded significantly, the present invention allows this incident and assumes that the user did post it. The frequency of adult posts is updated to reflect this new post.

15. A new link is posted by the user (or by the hijacker). This time the site is classified as an illegal drugs site. The baseline doesn't include any past links to such sites by the user. At this stage, the present invention reports this action to the user and suspects that the link was posted by a hijacker.

FIG. 5 presents an example of how the present invention detects a possible hijacker activity due to deviation from a baseline.

21. Ten different links are posted by the user (or by the hijacker) on the user's page (e.g. on the user's Facebook™ wall)
22. (Similar to step 12 of FIG. 4) One of the ten links is classified by the present invention as a gambling site.
23. (Similar to step 13 of FIG. 4) The present invention checks the user's baseline and finds that the user normally posts links to gambling sites at a frequency of three links per month. Taking into account this new link, the frequency of posting links to gambling sites is not exceeded significantly, so the present invention allows this incident and assumes that the user did post the link. The frequency of gambling posts is updated to reflect this new post.
24. The other nine different links that were posted by the user (or by the hijacker) are checked. All nine links are classified as links to adult sites. The present invention checks the user's baseline and finds that the user normally posts links to adult sites at a frequency of five links a week. Taking into account these nine links, the frequency of posting links to adult sites is exceeded significantly (nine in one day in comparison to five per week). At this stage, the present invention reports this action to the user and suspects that the link was posted by an hijacker.

Inappropriate Language

Using a database of inappropriate words and phrases, for example, words that are obscene, racist or harassing (cyberbullying), the present invention checks all the messages (chat and otherwise) that are created by the user, as well as all the user's status updates, and counts the frequencies with which these words appear, or else determines which of these words appear at all. When the user drastically increases the usage of inappropriate words or phrases, or begins to use new words or phrases that appear in the database, the present invention reports to him/her that this language is not typical to him/her, and raises the suspicion that his/her account has been hijacked.

During baseline monitoring, for example during the first week of monitoring, the user is notified and queried if two forbidden words appear in the same message. Words that the user admits to using regularly are removed from the dictionary of forbidden words. Subsequently, any word in the dictionary of forbidden words is treated as suspicious.

Other "inappropriate" words and phrases may indicate a sudden change in the user's psychological mood, rather than hijacking of the user's account.

Correlation of Links and Inappriate Language

When a hijacker abuses a stolen account to spread viral links in addition to inappropriate language, the present invention detects the deviations from baseline in both the links and the inappropriate language, and reports the incident to the user with increased confidence level, as the two types of deviations together are more likely to occur as a result of hijacking than is either deviation separately.

Profile Changes: Profile Auditing

Normally, users tend to keep their profile information unchanged. When a user does change his/her profile information, the change is usually incremental. The present invention performs constant auditing of the user profile. When a change is not incremental and/or contradicts the user's previous profile, the present invention detects this anomaly and warns the user that his/her profile might have been changed by a hijacker. Note that no baseline is needed to monitor anomalous profile changes.

Examples of anomalous profile changes include:
Birthday changes.
Gender Changes.
Manipulations of work history and replacement of an existing job with a new job that overlaps in time with the old job and/or is inconsistent with the user's birthday or gender.

Profile Changes: Profile Freeze

In addition to monitoring profile changes, the present invention also offers the user the option of freezing his/her profile if s/he doesn't plan to perform any changes. Thus, when his/her profile changes, the present invention immediately detects this change and warns the user. A typical use for such feature is to freeze the user's status and posts on the social network site, for users who are not active, and don't wish to post anything. Thus, when a hijacker starts exploiting such a user's profile and posts malware or spam, the present invention detects this abuse and warns the user.

Abuse Mitigation

While the present invention may not be able to delete abusive content from the user's account, if the social network developers' platform forbids such a deletion, the present invention nevertheless can provide some remediation by submitting new content on behalf of the user to warn him/her and his/her friends about the bad post.

Figure 6:
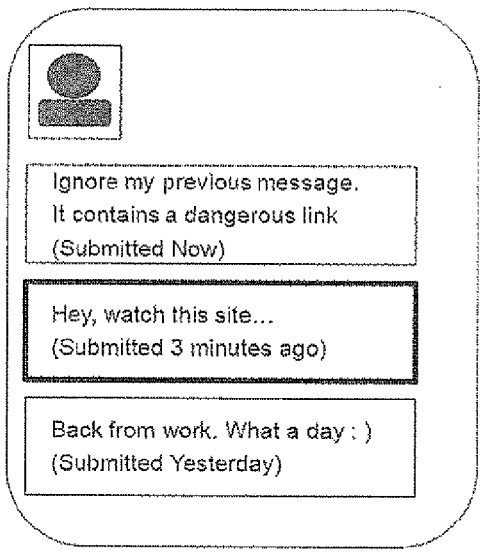
FIG. 6 illustrates abuse mitigation by posting a disclaimer.

FIG. 6 shows an example of a dangerous link that was posted by a hijacker on behalf of the user (highlighted in bold). The present invention detects this link and posts the message: "Ignore my previous message. It contains a dangerous link". In this way the present invention warns the user's friends not to access the dangerous link, and potential damage to the user's reputation is mitigated.

Obscene or insulting messages and status updates that are likely to have been sent by a hijacker are mitigated similarly. Messages and status updates that suggest a sudden change in the user's psychological mood are mitigated by warning the user. All such messages and status updates could be symptomatic of an effort by a hacker to embarrass or slander the user.

On-line Presence

The present invention automatically detects cases of hacked accounts by monitoring online presence. Usually users stick to their routines when it comes to the time frames during which they stay on-line in their social networks. When the present invention detects user activity during unusual hours the incident is reported to the user.

When the present invention detects messages that are posted at unusual times, or in time patterns that are unusual, more severe filtering restrictions are applied to these messages. For example, any new link that is posted by a user late at night may trigger a hacked account warning.

Figure 7:
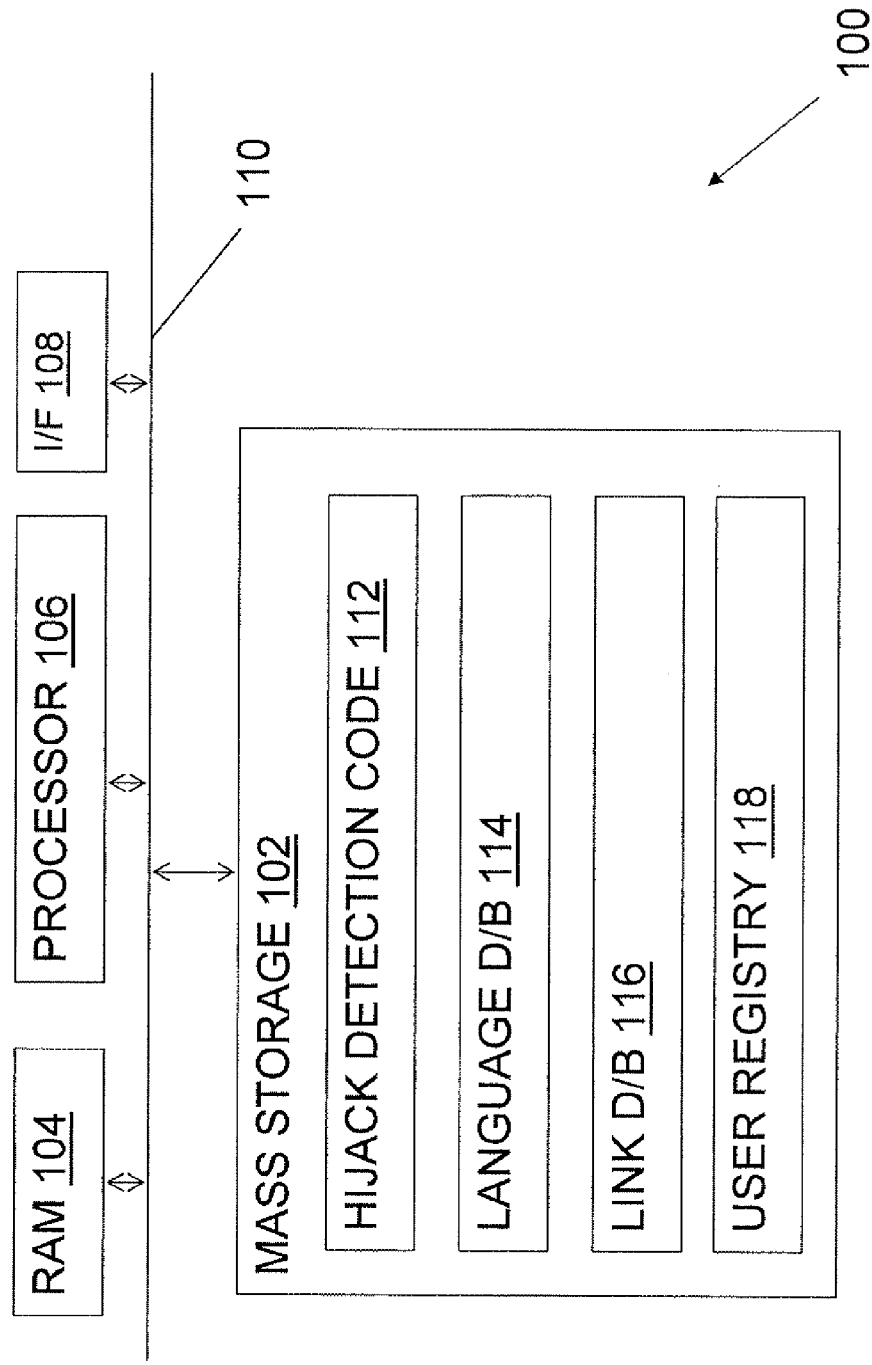
FIG. 7 is a partial high-level block diagram of a system of the present invention.

FIG. 7 is a partial high-level block diagram of an exemplary system 100 of the present invention. Specifically, FIG. 7 is a partial high-level block diagram of a server that is part of a social network platform and that has been configured to detect account hijacking according to the principles of the present invention. Only the components of system 100 that are germane to the present invention are illustrated in FIG. 7. System 100 includes a processor 106, two memories 102 and 104, and an interface 108 to the Internet. Memory 102 is non-volatile mass storage, such as a hard disk or a flash disk, in which is stored executable code 112 for implementing the present invention as described above. Memory 104 is a random access memory (RAM). Under the control of an operating system (not shown), processor 106 loads code 112 into RAM 104 and executes code 112 in RAM 104. Interface 108 is used by system 100 for communicating with users of the social network, as described above. In support of the present invention, also stored in memory 102 are a database 114 of inappropriate language, a database 116 of classified links, and a user registry 118.

Memory 102 is an example of a computer-readable storage medium bearing computer-readable code for implementing the present invention. Other examples of such storage media include read-only media such as DVDs that bear such code.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of protecting a user of a social network, comprising the steps of:
   (a) monitoring activity of the user on the social network during a baseline monitoring period to determine a baseline activity record, said monitoring including: if an instance of said activity is suspicious, asking the user whether said instance is a normal activity instance of said user;
   (b) monitoring activity of the user on the social network subsequent to said baseline monitoring period;
   (c) determining whether said activity of the user on the social network subsequent to said baseline monitoring deviates sufficiently from said baseline activity record to indicate abuse of the user's account on the social network; and
   (d) if said activity of the user on the social network subsequent to said baseline monitoring deviates sufficiently from said baseline activity record to indicate abuse of the user's account on the social network: mitigating said abuse.

2. The method of claim 1 wherein said activity includes posting links.

3. The method of claim 2, wherein said monitoring includes monitoring a frequency of said posting.

4. The method of claim 2, wherein said monitoring includes classifying said links among a plurality of classes and calculating statistics of said links in at least one of said classes.

5. The method of claim 4, where said classes are selected from the group consisting of neutral, news, shopping, gambling, drugs, terror, xenophobia, adult, malware, hacking, criminal activity and child abuse.

6. The method of claim 2, wherein said monitoring includes monitoring respective distributions of said links and calculating statistics of said distributions.

7. The method of claim 2, wherein said mitigating includes posting a disclaimer of at least one of said links.

8. The method of claim 1, wherein said activity includes status updates.

9. The method of claim 8, wherein said monitoring includes classifying words used in said status updates among a plurality of classes and calculating statistics of said words in at least one of said classes.

10. The method of claim 9, wherein said classes are selected from the group consisting of neutral, racist, obscene, psychopathological, suicidal and cyberbullying.

11. The method of claim 8, wherein said mitigating includes posting a disclaimer of at least one of said status updates.

12. The method of claim 1, wherein said activity includes sending messages.

13. The method of claim 12, wherein said monitoring includes classifying words used in said messages among a plurality of classes and calculating statistics of said words in at least one of said classes.

14. The method of claim 13, wherein said classes are selected from the group consisting of neutral, racist, obscene, psychopathological, suicidal and cyberbullying.

15. The method of claim 12, wherein said mitigating includes sending a disclaimer of at least one said message.

16. The method of claim 1, wherein said activity includes changing a profile and wherein said monitoring includes monitoring a frequency of said changing.

17. The method of claim 1, wherein said activity includes changing at least one entry in a profile and wherein said monitoring subsequent to said baseline monitoring includes checking a consistency of said changing of said at least one entry with a prior configuration of said profile.

18. The method of claim 1, wherein said monitoring includes logging times of said activity and calculating statistics of said times.

19. The method of claim 1, wherein said mitigating includes notifying the user of said abuse.

20. The method of claim 1, wherein said monitoring includes calculating joint statistics on at least one respective aspect of each of two modes of said activity.

21. The method of claim 20, wherein said two modes are posting links and status updates, and wherein said at least one respective aspect of said posting of said statuses includes at least one class of words that are used in said statuses.

22. The method of claim 20, wherein said two modes are posting links and sending messages, and wherein said at least one respective aspect of said sending of said messages includes at least one class of words that are used in said messages.

23. The method of claim 1, wherein said suspicious instance of said activity includes posting a link from a suspicious category.

24. The method of claim 1, wherein said suspicious instance of said activity includes sending a message that includes at least one forbidden word.

25. A system for managing a social network, comprising:
   (a) a memory for storing code for protecting a user of the social network by:
      (i) monitoring activity of said user on the social network during a baseline monitoring period to determine a baseline activity record, said monitoring including: if an instance of said activity is suspicious, asking the user whether said instance is a normal activity instance of said user,
      (ii) monitoring activity of said user on the social network subsequent to said baseline monitoring period,
      (iii) determining whether said activity of said user on the social network subsequent to said baseline monitoring deviates sufficiently from said baseline activity record to indicate abuse of said user's account on the social network, and
      (iv) if said activity of said user on the social network subsequent to said baseline monitoring deviates sufficiently from said baseline activity record to indicate abuse of said user's account on the social network: mitigating said abuse; and
(b) a processor for executing said code.

26. A non-transitory computer-readable storage medium having embodied thereon computer-readable code for protecting a user of a social network, the computer-readable code comprising:
  (a) program code for monitoring activity of the user on the social network during a baseline monitoring period to determine a baseline activity record, said monitoring including: if an instance of said activity is suspicious, asking the user whether said instance is a normal activity instance of said user;
  (b) program code for monitoring activity of the user on the social network subsequent to said baseline monitoring period;
  (c) program code for determining whether said activity of the user on the social network subsequent to said baseline monitoring deviates sufficiently from said baseline activity record to indicate abuse of the user's account on the social network; and
  (d) program code for: if said activity of the user on the social network subsequent to said baseline monitoring deviates sufficiently from said baseline activity record to indicate abuse of the user's account on the social network: mitigating said abuse.

* * * * *